United States Patent [19]
Jenkins

[11] 3,844,219
[45] Oct. 29, 1974

[54] PLATFORM CONVEYORS
[75] Inventor: Martyn Frederick Jenkins, Edingale, Tamworth, England
[73] Assignee: Dunlop Limited, London, England
[22] Filed: Sept. 21, 1973
[21] Appl. No.: 399,731

[30] Foreign Application Priority Data
Sept. 26, 1972 Great Britain.................. 44514/72

[52] U.S. Cl................ 104/25, 198/110, 198/16 MS
[51] Int. Cl.............................................. A63g 1/00
[58] Field of Search.......... 104/25, 20, 18; 198/110, 198/16 R, 16 MS

[56] References Cited
UNITED STATES PATENTS
3,592,140   7/1971   Zuppiger.............................. 198/16
3,744,430   7/1973   Zuppiger.............................. 198/110

Primary Examiner—M. Henson Wood, Jr.
Assistant Examiner—D. W. Keen
Attorney, Agent, or Firm—Stevens, Davis, Miller & Mosher

[57] ABSTRACT

A platform conveyor comprising a low-speed zone, a high-speed zone and an intermediate variable speed zone comprising a plurality of platforms in edge-to-edge contact in the load bearing part of the conveyor which, in the varible speed zone move laterally relative to one another, each platform having provided parallel raised portions defining parallel grooves across a surface of the platform forming a load bearing surface, said portions being combed by a comb member wherein each contiguous pair of platforms at the adjacent edges has one platform of the pair provided at its adjacent edge with raised portions of resilient material, of which the following is a Specification.

13 Claims, 2 Drawing Figures

PLATFORM CONVEYORS

This invention relates to platform conveyors and in particular to tread surfaces used for platform conveyors in which relative movement occurs between adjacent platforms.

A platform conveyor of this type is described in British Pat. specification No. 1,251,133 in which relative lateral movement between adjacent platforms is used to achieve a variation in the speed of the platform in a variable speed zone between a low speed zone and a high speed zone. To allow safe use of such conveyors the upper surfaces of the platforms may be grooved and combs are then provided at the ends of the load-bearing regions which sweep the grooves in the same way as in straight line conveyors and escalators. The relative lateral movement of the platforms in the variable speed zone results in the ends of the grooves across each platform moving at an angle to the direction of the grooves and this movement causes any obstruction lying in the grooves to be sheared off, to jam the platforms, or damage the tread groove formation.

According to one aspect of the present invention a platform conveyor comprising a low-speed zone, a high-speed zone and an intermediate variable speed zone comprises a plurality of platforms in edge-to-edge contact in the load-bearing part of the conveyor which, in the variable speed zone move laterally relative to one another, each platform having provided parallel raised portions defining parallel grooves across a surface of the platform forming a load-bearing surface, said portions being combed at the end of the load-bearing part conveyor or by interengagement of the grooves with a comb member wherein each contigous pair of platforms at the adjacent edges has one platform of the pair provided at its adjacent edge with raised portions of resilient material.

Resilient ends of the grooves may be provided at both edges of each platform at which sliding occurs, at one edge of each platform, or at both edges of every other platform in the conveyor. The arrangement utilised must be chosen so that at every junction between platforms at which relative sliding occurs at least one platform provides resilient material grooves.

The resilient material may be of any material suitable to bear the load on the platform and allow deformation when an obstruction in a groove resists the relative platform movement. Suitable materials are natural rubber or polyurethane.

The grooves may additionally be formed with sloping side faces such that the interaction of grooves of adjacent platforms causes any obstructing matter to be raised out of the grooves.

In addition or as an alternative to the sloping side-edges, the raised portions may be made sloping at one or each end or edge in the longitudinal direction of the said portions so that the groove depth at the edge of the platforms is zero.

The grooves may be provided in two directions across each platform to allow for reverse running of the conveyor and combing at both ends.

When used for passengers it is advantageous if the passengers are encouraged to stand away from the relatively moving platform edges. This may be done by colouring the end regions only or alternatively, when the resilient material is provided only in the end regions by making the colours or appearance of the elastomeric material contrast with the colour or appearance of the remainder of the platforms. Such measures are also useful in disuading passengers from placing luggage, umbrella points or the like at the junction points and therefore reduces the number of occasions on which the resilient material has to be deformed.

One arrangement will now be described by way of example only in conjunction with the diagrammatic drawings in which.

Figure 1:
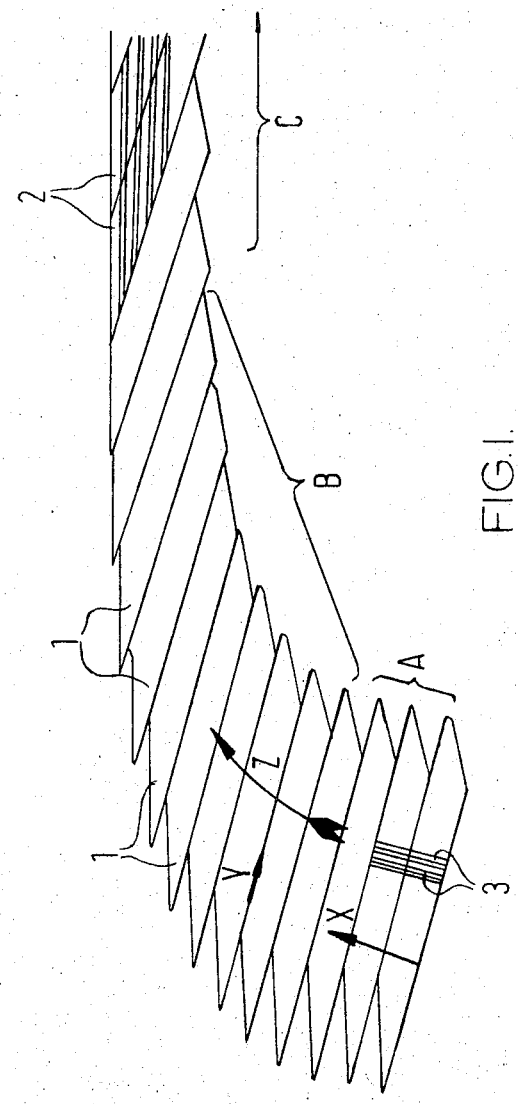
FIG. 1 shows part of a platform conveyor having a low-speed zone, a high-speed zone and an intermediate variable speed zone.

The conveyor part illustrated in FIG. 1 comprises a series of platforms 1 in the form of elongated parallelograms. The conveyor has three zones marked A, B and C. In zone A the platforms have a velocity only in the direction X, i.e., the direction perpendicular to the long sides of the platforms 1. In zone B the platforms 1 are given in addition a progressively increasing velocity in the direction Y, i.e., the direction parallel to the long sides of the platform 1. The velocity in the direction Y together with the velocity in the direction X causes the platforms to follow a curved path Z and to progressively increase in speed along the path Z. When the platforms reach the zone C the velocity in the A direction Y is maintained constant and the platforms move in a straight line at a higher speed than the first zone A.

In the variable speed zone the platforms 1 slide with respect to adjacent platforms in the direction Y and are maintained in edge-to-edge relationship to provide a continuous load-carrying surface.

The conveyor may be of other shapes to the parabolic curve shown in FIG. 1 and may be used for either accelerating, decelerating or, in some shaped-path conveyors, for both accelerating and then decelerating a load.

To provide means for clearing the platforms of debris and for safety reasons means for combing a series of grooves 2 in the load-bearing surfaces is provided. A set of parallel grooves 2 are formed on the upper surface of each platform and extend in a direction such that a comb at the end of the conveyor is able to sweep the grooves as the platforms pass under the comb. In the conveyor of FIG. 1 the grooves 2 would be formed in the direction shown in the high-speed zone C. For reverse movement of the conveyor as a decelerator the grooves would run as shown in part as grooves 3 in the low speed zone A. (In each case only a small area has been shown with grooves although it will be undetstood that in practice the grooves will extend over the whole load bearing surface of each platform). For a conveyor useable in either direction both type of grooves may be provided on each platform.

Figure 2:
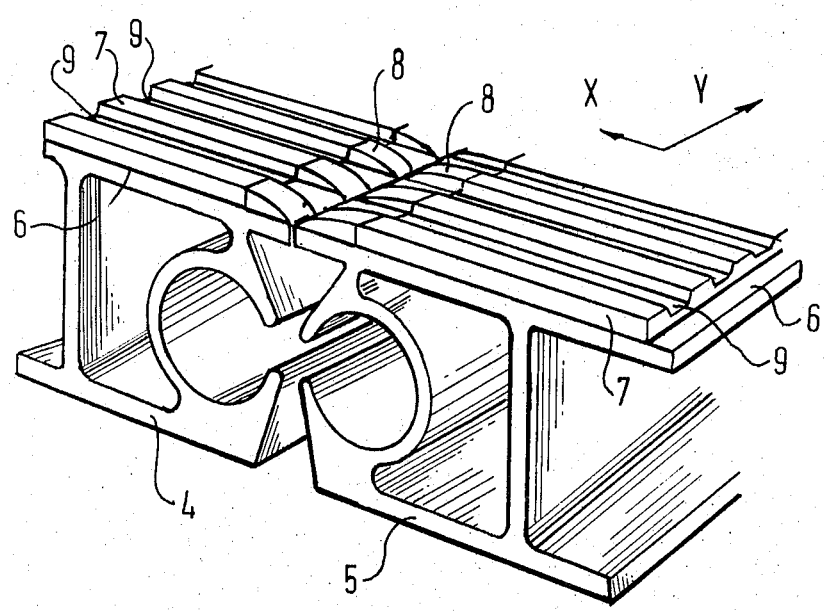
FIG. 2 is a scrap view showing the adjacent edge regions of two platforms.

FIG. 2 shows the part of two adjacent edges of two platforms 4,5 in which the relative sliding occurs along the line Q. Each platform 4,5 has a flat upper surface 6. A tread plate 7 is attached to the upper surface 6 so that it covers the whole load carrying portion of that surface.

The tread plate 7 is formed in metal except for a strip 8 along the edges at which a relative sliding occurs. The strip 8 is formed from flexible resilient polyurethane.

Tread grooves 9 are formed in the tread plate and extend through the metal and polyurethane regions.

The platforms 4,5 are thus provided with a grooved upper surface in which the end portions of the material forming the grooves are resilient. Thus when relative sliding occurs an obstruction in the grooves causes deflections of the end portions of the grooves and damage to or jamming of the conveyor is avoided.

As shown in FIG. 2 the slides of the grooves may in addition be made sloping such that the groove is wider at the top. A suitable angle of slope is 45°. The sloping sides of grooves in adjacent platforms cause obstructing matter which lies along a groove and into the groove of the grooves when relative sliding occurs. This measure further reduces the chances of platform damage.

Furthermore, and again as shown in FIG. 2, the groove depth of the edges may be reduced by making the raised portions which define the grooves 9 slope downwardly in the longitudinal direction of the grooves. The end part of each raised portion is then wedge-shaped. As there is then effectively no groove at the edge of the platforms, small obstructions are less likely to prevent the relative platform sliding.

For passenger use of platform conveyors it is advantageous if the passengers are discouraged from standing or placing objects of luggage, umbrella tips or the like on the junction betweeen the platforms. The different material at the edges and the change in groove depth indicates to a passenger that the edge regions are different and this may be further emphasised by distinctively colouring the elastomeric material in the strips 8 so that they contrast with the remainder of the platforms.

If required the whole tread plate 7 may be formed of elastomeric material. In such a case the edge strips 8 may be of more resilient material, of the same material and/or of differently coloured material as the main portion of the tread plate. Alternatively the grooves of the main central area may be formed in the upper surface 6 of the platforms and the resilient strips may be made separately and attached to the edges of each platform.

Any plastics or elastomeric material having suitable resilient properties may be used in place of polyurethane.

Having now described our invention — what we claim is:

1. A platform conveyor comprising a low-speed zone, a high-speed zone and an intermediate variable speed zone comprising a plurality of platforms in edge-to-edge contact in the load bearing part of the conveyor which, in the variable speed zone move laterally relative to one another, each platform having provided parallel raised portions defining parallel grooves across a surface of the platform forming a load-bearing surface, said portions being combed at the end of the load-bearing part of the conveyor by interengagement of the grooves with a comb member wherein each contiguous pair of platforms at the adjacent edges has one platform of the pair provided at its adjacent edge with raised portions of resilient material.

2. A conveyor according to claim 1 wherein the adjacent edges at which sliding occurs are all provided with raised portions of resilient material.

3. A conveyor according to claim 1 wherein both edges of every other platform forming the conveyor are provided with raised portions of resilient material.

4. A conveyor according to claim 1 wherein the resilient raised portions at the edges of the platform are detachable from the platforms to allow ready replacement.

5. A conveyor according to claim 1 wherein the raised portions across the full width of the platforms are of resilient material.

6. A conveyor according to claim 5 wherein the edge portions of the raised portions are of a more resilient material than the central portions.

7. A conveyor according to claim 1 wherein the raised portions have sloping sides whereby movement between the grooves of adjacent platforms in relative sliding motion causes obstructing matter in the grooves to be raised out of the grooves.

8. A conveyor according to claim 1 wherein the raised portions are sloping at one end in the longitudinal direction of the said portions so that the groove depth at the edge of the platform is zero.

9. A conveyor according to claim 8 wherein both ends of each raised portion is sloping.

10. A conveyor according to claim 1 wherein the edge portion of the raised portions comprises a material of contrasting colour to the remainder of the raised portions.

11. A conveyor according to claim 1 wherein grooves are formed in two directions across each platform so that combing may be carried out at both ends of the conveyor to allow for reverse direction operation.

12. A conveyor according to claim 1 wherein the resilient material is natural rubber.

13. A conveyor according to claim 1 wherein the resilient material is polyurethane.

* * * * *